US012658078B2

(12) United States Patent
Huang et al.

(10) Patent No.: US 12,658,078 B2
(45) Date of Patent: Jun. 16, 2026

(54) DISPLAY DEVICE

(71) Applicant: Shenzhen China Star Optoelectronics Semiconductor Display Technology Co., Ltd., Shenzhen (CN)

(72) Inventors: Yichun Huang, Shenzhen (CN); Xiaohong Jing, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 236 days.

(21) Appl. No.: 18/401,560

(22) Filed: Dec. 31, 2023

(65) Prior Publication Data

US 2025/0174161 A1 May 29, 2025

(30) Foreign Application Priority Data

Nov. 24, 2023 (CN) ........................ 202311584827.7

(51) Int. Cl.
*G09F 11/02* (2006.01)
*G09F 9/30* (2006.01)

(52) U.S. Cl.
CPC .............. *G09F 11/02* (2013.01); *G09F 9/301* (2013.01)

(58) Field of Classification Search
CPC .......... G09F 11/02; G09F 11/18; G09F 11/29; G09F 9/301; G09F 9/30; E04F 10/0611;
(Continued)

(56) References Cited

U.S. PATENT DOCUMENTS 10,845,696 B2 * 11/2020 Song ..................... G06F 1/1601
2012/0200915 A1 * 8/2012 Kuroi ..................... G03B 21/58
359/443
(Continued)

FOREIGN PATENT DOCUMENTS

CN 201194147 Y * 2/2009 ............ G03B 21/58
CN 214846667 U 11/2021
(Continued)

OTHER PUBLICATIONS

Japanese Office Action issued in corresponding Japanese Patent Application No. 特願 2023-221107 dated Feb. 25, 2025, pp. 1-7.
(Continued)

*Primary Examiner* — Cassandra Davis
(74) *Attorney, Agent, or Firm* — PV IP PC; Peter Stecher; Wei Te Chung

(57) ABSTRACT

A display device including a housing with a first side plate and a second side plate, a reel assembly, a first cover plate, and a display module; the reel assembly includes a rotating shaft rotatably connected to the first side plate and the second side plate, respectively; the first cover plate is movable in a direction close to or away from the rotating shaft. Both ends of the display module are fixedly connected to the first cover plate and the rotating shaft, respectively, wherein in a case that a large distance exists between the first cover plate and the rotating shaft, a display area of the first display portion in the display module connected to the first cover plate is large.

19 Claims, 6 Drawing Sheets

(58) Field of Classification Search
CPC .............. E04F 10/0614; E04F 10/0618; E04F 10/0629; E06B 9/17007–17023; E06B 9/42; G03B 21/58; G02B 27/0149; G02B 2027/015; G02B 2027/0152; G02B 2027/0154; G02B 2027/0161; B60K 35/22–235
USPC .............. 40/514, 515; 160/24, 26, 238–261; 359/461
See application file for complete search history.

(56) References Cited

U.S. PATENT DOCUMENTS

| | | | | |
|---|---|---|---|---|
| 2016/0363960 | A1 | 12/2016 | Park | |
| 2016/0374228 | A1 | 12/2016 | Park | |
| 2017/0196102 | A1 | 7/2017 | Shin | |
| 2020/0020255 | A1 | 1/2020 | Yoon | |
| 2020/0084897 | A1 * | 3/2020 | Shin | H05K 1/147 |
| 2020/0365063 | A1 * | 11/2020 | Park | G06F 1/1601 |
| 2021/0201713 | A1 * | 7/2021 | Chung | G09F 9/301 |
| 2022/0369477 | A1 | 11/2022 | Jo | |

FOREIGN PATENT DOCUMENTS

| | | | |
|---|---|---|---|
| CN | 215067704 | U | 12/2021 |
| CN | 115202141 | A | 10/2022 |
| JP | 2825692 | B2 * | 11/1998 |
| JP | 2010526335 | A | 7/2010 |
| JP | 5245677 | B2 * | 7/2013 |
| JP | 2020504330 | A | 2/2020 |
| JP | 2021021946 | A | 2/2021 |
| JP | 2022112785 | A | 8/2022 |
| JP | 2023504012 | A | 2/2023 |
| KR | 20230155148 | A | 11/2023 |
| WO | 2019111576 | A1 | 6/2019 |

OTHER PUBLICATIONS

Korean Office Action issued in corresponding Korean Patent Application No. 10-2023-0189953 dated Mar. 11, 2025, pp. 1-6.

Japanese Office Action issued in corresponding Japanese Patent Application No. 特願 2023-221107 dated Aug. 20, 2024, pp. 1-3.

* cited by examiner

DISPLAY DEVICE

CROSS-REFERENCE TO RELATED APPLICATION

This application claims priority to and the benefit of Chinese Patent Application No. 202311584827.7, filed on Nov. 24, 2023, the disclosure of which is incorporated herein by reference in its entirety.

TECHNICAL FIELD

The present application relates to a field of display technologies, and more particularly, to a display device.

BACKGROUND

Compared with liquid crystal displays, organic light emitting diode (OLED) display panels have numerous advantages, such as thinner, better display effect, higher resolution, wider color gamut, lower power consumption and flexible display, which contributes to rapid development of the display panels in recent years, and establishes a broad market application prospect.

At present, a medium-sized and large-sized OLED display device has a problem of a large occupation area and a single application scenario, and this problem is urgently to be solved.

SUMMARY

Some embodiments of the present application provide a display device, which can effectively solve the problem of a large occupied area and a single application scenario of a medium-sized and large-sized OLED display device.

The embodiments of the present application provide a display device, the display device includes: a housing, wherein the housing includes a first side plate and a second side plate, and the first side plate and the second side plate are oppositely disposed; a reel assembly, wherein the reel assembly includes a rotating shaft rotatably connected to the first side plate and the second side plate, respectively; a first cover plate, wherein the first cover plate is provided on a side of the rotating shaft, and the first cover plate is movable in a direction close to or away from the rotating shaft; a display module, wherein an end of the display module is fixedly connected to the first cover plate, another end of the display module is fixedly connected to the rotating shaft, and the display module includes a first display portion connected to the first cover plate; in a case that a first distance is defined between the first cover plate and the rotating shaft, the first display portion has an area a; in a case that a second distance is defined between the first cover plate and the rotating shaft, the first display portion has an area b, and the second distance is less than the first distance, and a and b are satisfied with: $b<a$; and the display module further includes a first non-display portion and a second display portion, wherein the first non-display portion is wound on the rotating shaft, and the second display portion is disposed between the first non-display portion and the first display portion, and a display surface of the second display portion and a display surface of the first display portion are respectively located on different sides of the rotating shaft.

In some embodiments of the present application, in a case that a third distance is defined between the first cover plate and the rotating shaft, a display area of the first display portion is c, wherein the third distance is greater than the second distance and less than the first distance, and a, b and c are satisfied with: $b<c<a$; and the display module further includes a first non-display portion and a second display portion, wherein the first non-display portion is wound around the rotating shaft, and the second display portion is disposed between the first non-display portion and the first display portion, and a display surface of the second display portion and a display surface of the first display portion are respectively located on different sides of the rotating shaft.

In some embodiments of the present application, the reel assembly further includes a first reel and a second reel, wherein the first reel and the second reel are spaced apart and are each provided on a side of the rotating shaft away from the first cover plate, wherein the first reel is rotatably connected to the first side plate and the second side plate, respectively, and the second reel is rotatably connected to the first side plate and the second side plate, respectively; wherein the display module includes a first portion and a second portion, wherein the first portion is disposed between the first cover plate and the first reel, and the second portion is disposed between the rotating shaft and the second reel, in a case that the first distance is defined between the first cover plate and the rotating shaft, the first portion is the first display portion; in a case that the second distance is defined between the first cover plate and the rotating shaft, the first portion is the first display portion, and the second portion is the second display portion.

In some embodiments of the present application the display module further includes a third portion disposed between the first reel and the second reel, wherein in a case that the second distance is defined between the first cover plate and the rotating shaft, the display module further includes a third display portion disposed between the first display portion and the second display portion, wherein a display surface of the third display portion, the display surface of the first display portion, and the display surface of the second display portion are respectively located on different sides of the rotating shaft, and the third portion is the third display portion.

In some embodiments of the present application, the reel assembly further includes a first reel, wherein the first reel is disposed on a side of the rotating shaft away from the first cover plate, and the first reel is rotatably connected to the first side plate and the second side plate, respectively; wherein the display module includes a first portion and a second portion, wherein the first portion is disposed between the first cover plate and the first reel, and the second portion is disposed between the rotating shaft and the first reel, wherein in a case that the first distance is defined between the first cover plate and the rotating shaft, the first portion is the first display portion; in a case that the second distance is defined between the first cover plate and the rotating shaft, the first portion is the first display portion, and the second portion is the second display portion.

In some embodiments of the present application, the display device further comprising a support assembly, the support assembly includes a first support plate and a second support plate, wherein the first support plate is disposed on a side of the first portion facing the second portion and abuts the first portion; and the second support plate is disposed on a side of the second portion facing the first portion and abuts the second portion.

In some embodiments of the present application, the rotating shaft includes a rotating shaft body and a coil spring, wherein the rotating shaft body has a cavity, and the coil spring is arranged in the cavity; in a case that the first distance is defined between the first cover plate and the bottom plate, the coil spring is in a stretched state; in a case that the second distance is defined between the first cover plate and the bottom plate, the coil spring is in a retracted state.

In some embodiments of the present application, the reel assembly further includes a connecting rod, the connecting rod is connected to the first cover plate, and the connecting rod is extendable or shortenable to move the first cover plate in a direction close to or away from the rotating shaft.

In some embodiments of the present application, the connecting rod includes: a first connecting rod and a second connecting rod, wherein the first connecting rod and the second connecting rod are disposed crosswise and rotatably connected; a third connecting rod and a fourth connecting rod, wherein the third connecting rod and the fourth connecting rod are disposed crosswise and are rotatably connected, an end of the third connecting rod is rotatably connected to an end of the first connecting rod, and another end of the third connecting rod is rotatably connected to the first cover plate; an end of the fourth connecting rod is rotatably connected to an end of the second connecting rod, and another end of the fourth connecting rod is rotatably and slidably connected to the first cover plate.

In some embodiments of the present application, the connecting rod further includes: a fixing rod and a sliding rod, wherein an end of the fixing rod is fixedly connected to the first side plate, an end of the sliding rod is slidably connected to the second side plate, and another end of the fixing rod is slidably connected to another end of the sliding rod; wherein another end of the first connecting rod is rotatably connected to the fixed rod, and another end of the second connecting rod is rotatably connected to the sliding rod

BRIEF DESCRIPTION OF THE DRAWINGS

In order to explain the technical solutions in the embodiments of the application more clearly, the drawings needed in the description of the embodiments are briefly introduced below. It is obvious that the following drawings are merely some of the embodiments of the present application, and other drawings may be made to those skilled in the art without involving any inventive effort.

Figure 1:
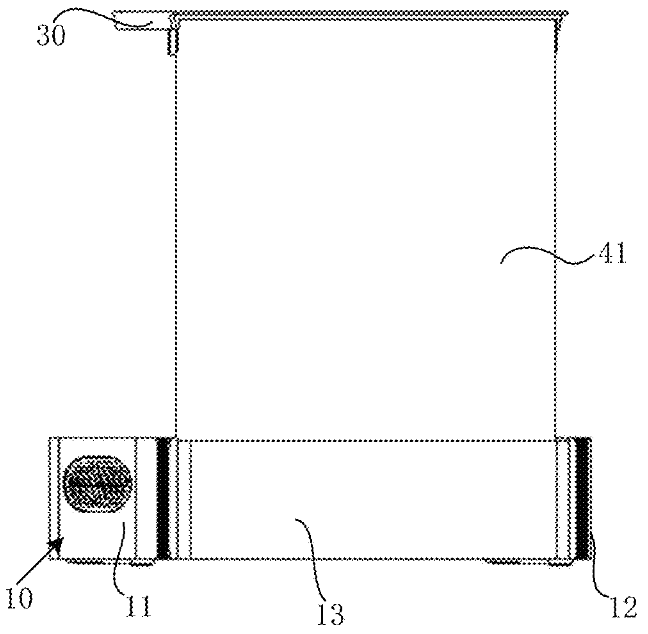
FIG. 1 is a perspective view of a display device according to Embodiment 1 of the present application in a first state.
Figure 2:
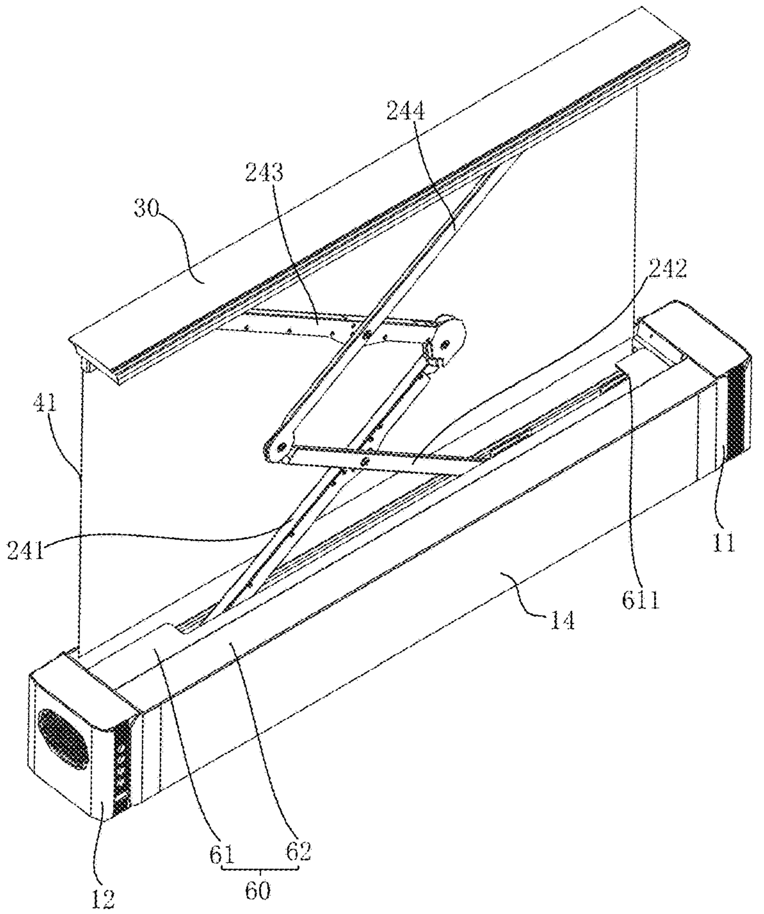
FIG. 2 is a perspective view of a display device according to Embodiment 1 of the present application in a first state from another perspective.
Figure 3:
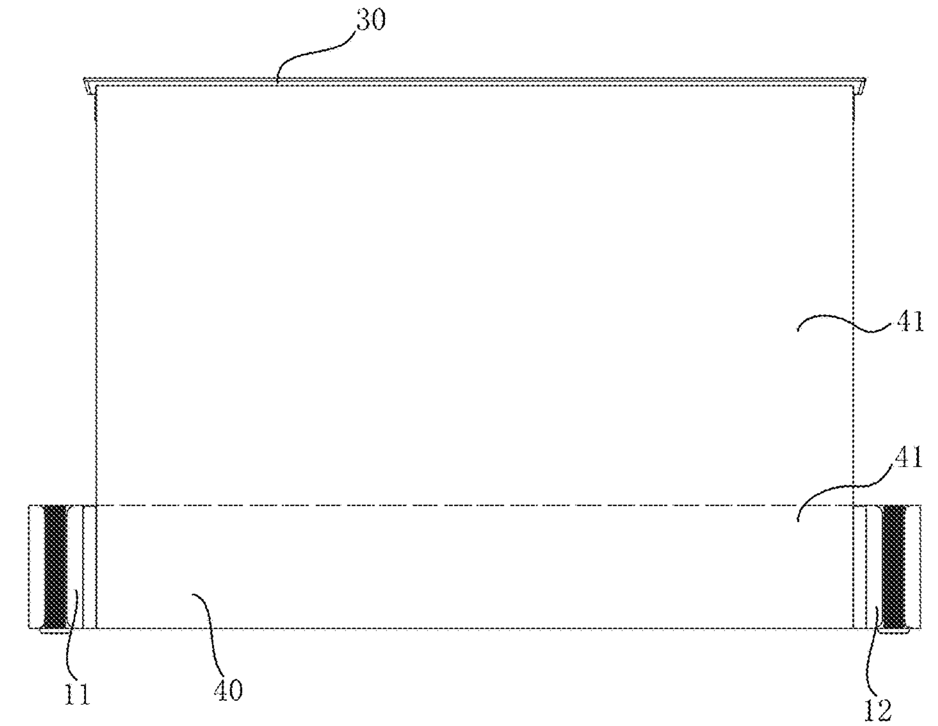
FIG. 3 is a front sectional view of a display device according to Embodiment 1 of the present application in a first state.
Figure 4:
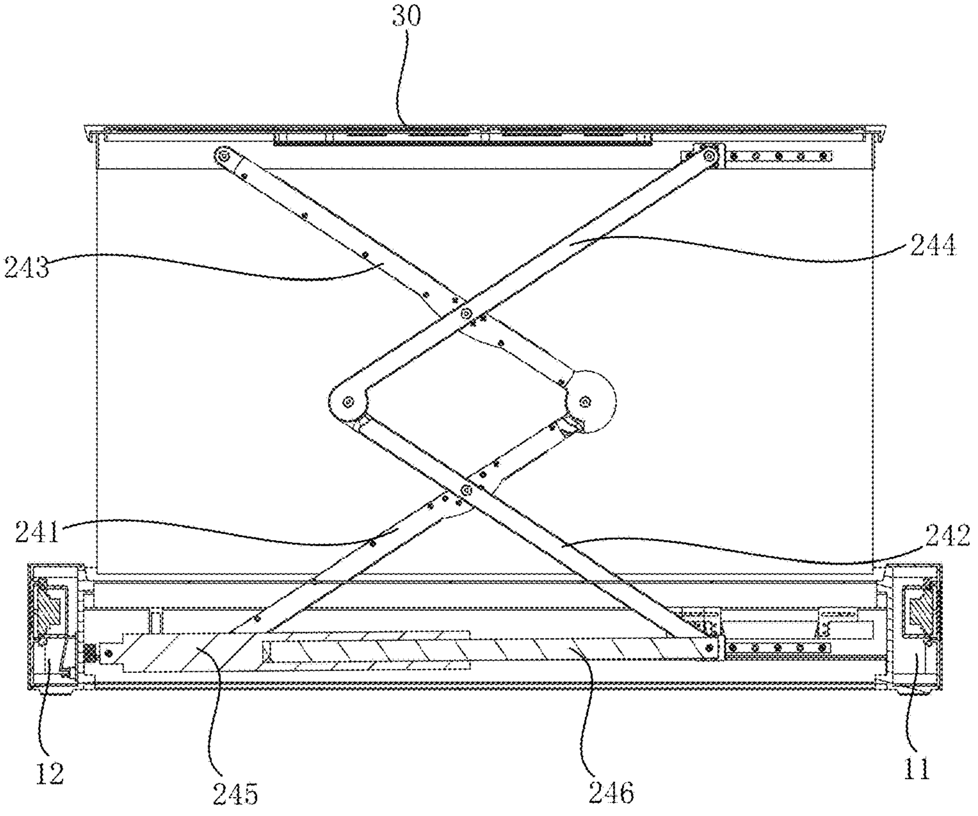
FIG. 4 is a rear sectional view of a display device according to Embodiment 1 of the present application in a first state.
Figure 5:
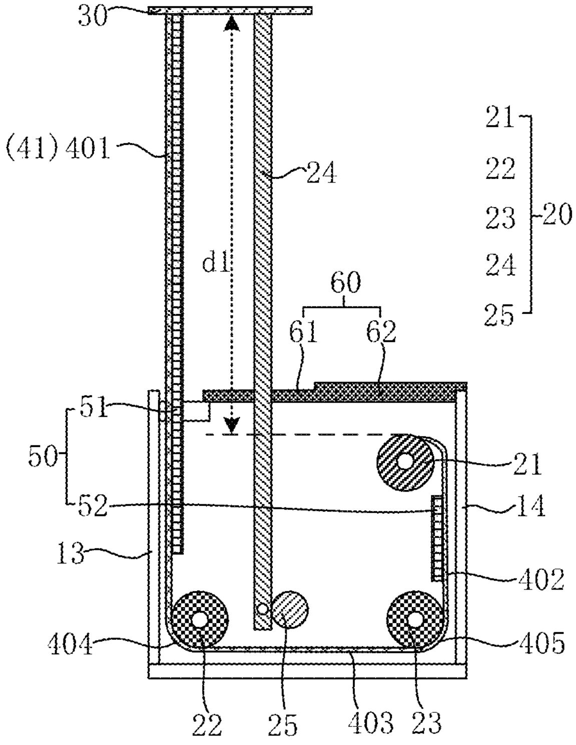
FIG. 5 is a right sectional view of a display device according to Embodiment 1 of the present application in a first state.
Figure 6:
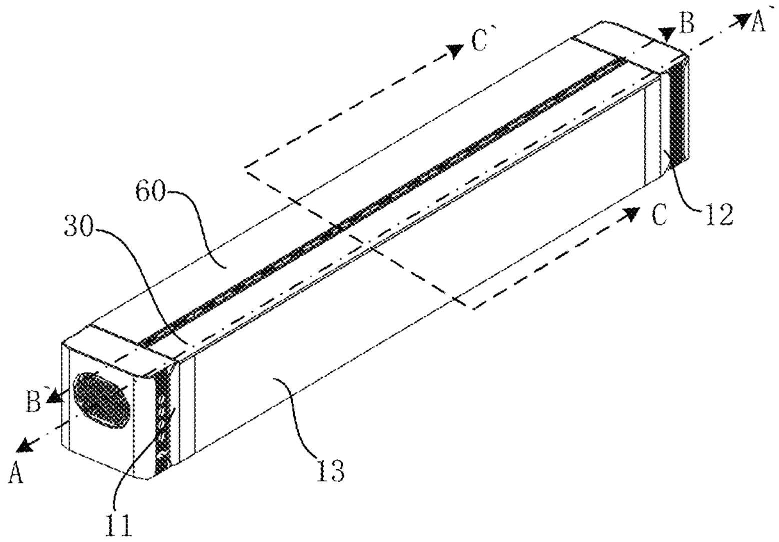
FIG. 6 is a perspective view of a display device according to Embodiment 1 of the present application in a second state.
Figure 7:
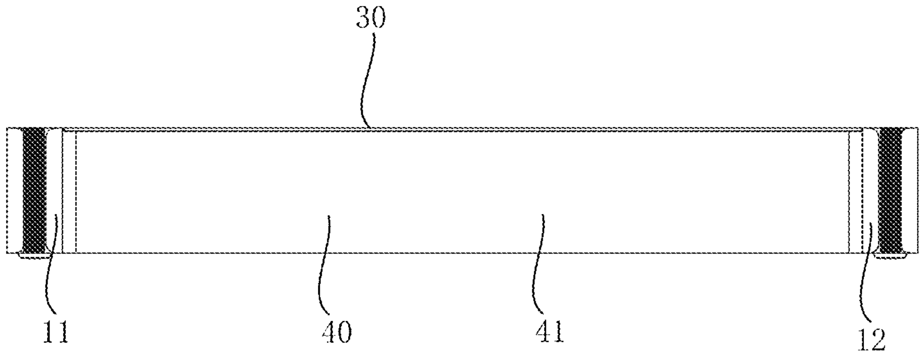
FIG. 7 is a front sectional view of the display device according to Embodiment 1 of the present application in a second state, taken along a line AA'.
Figure 8:
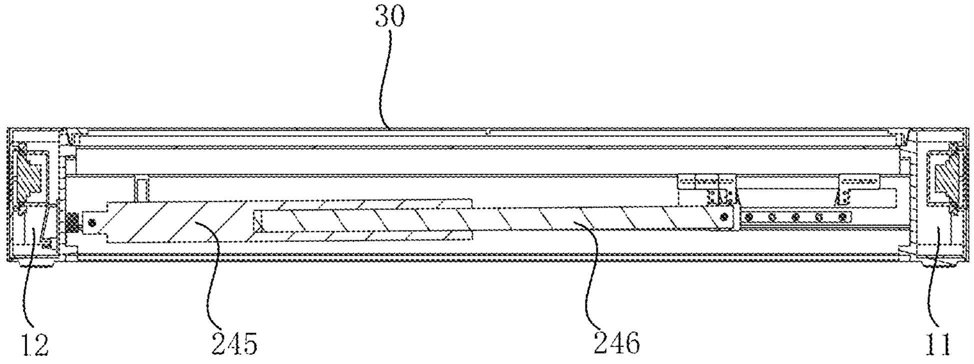
FIG. 8 is a rear sectional view of the display device according to Embodiment 1 of the present application in a second state, taken along a line BB'.

REFERENCE NUMERALS housing 10; first side plate 11; second side plate 12; third side plate 13; fourth side plate 14; reel assembly 20; rotating shaft 21; rotating shaft body 211; cavity 2111; coil spring 212; first reel 22; second reel 23; connecting rod 24; first connecting rod 241; second connecting rod 242; third connecting rod 243; fourth connecting rod 244; fixing rod 245; slide bar 246; motor 25; first cover plate 30; display module 40; first display portion 41; first non-display portion 42; first function portion 421; second function portion 422; second display portion 43; third display portion 44; first portion 401; second portion 402; third portion 403; first corner portion 404; second corner portion 405; third corner portion 406; support assembly 50; first support plate 51; second support plate 52; second cover plate 60; first sub-portion 61; opening 611; second sub-portion 62; first distance d1; second distance d2; and third distance d3.

DETAILED DESCRIPTION

In the following, the technical solutions in the embodiments of the present application are clearly and completely described in connection with the drawings in the embodiments of the present application. Obviously, the described embodiments are merely a part of the embodiments of the present application, rather than all the embodiments. Based on the embodiments in the present application, all other embodiments obtained by those skilled in the art without involving any inventive effort are within the scope of the present application. Furthermore, it should be understood that the specific embodiments described herein are for purposes of illustration and explanation only and are not intended to limit the application. In this application, unless otherwise stated, directional words such as "up" and "down" usually refer to the up and down side of the device in the actual operating or working state, specifically referring to the direction in the drawings; while "inside" and "outside" refer to the outline of the device.

Referring to FIG. 1 to FIG. 10, an Embodiment 1 of the present invention provide a display device including a housing 10, a reel assembly 20, a first cover plate 30, and a display module 40. The housing includes a first side plate 11 and a second side plate 12, wherein the first side plate 11 and the second side plate 12 are oppositely disposed. The reel assembly 20 includes a rotating shaft 21 rotatably connected to the first side plate 11 and the second side plate 12, respectively. The first cover plate 30 is provided on a side of the rotating shaft 21, and the first cover plate 30 is movable in a direction close to or away from the rotating shaft 21. An end of the display module 40 is fixedly connected to the first cover plate 30, another end of the display module 40 is fixedly connected to the rotating shaft 21, and the display module 40 includes a first display portion 41 connected to the first cover plate 30. In a case that a first distance d1 is defined between the first cover plate 30 and the rotating shaft 21, the first display portion 41 has an area a; in a case that a second distance d2 is defined between the first cover plate 30 and the rotating shaft 21, the area of the first display portion 41 is b, the second distance d2 is less than the first distance d1, and a and b are satisfied with: $b<a$. The display module 40 further includes a first non-display portion 42 and a second display portion 43, the first non-display portion 42 is wound around the rotating shaft 21, and the second display portion 43 is provided between the first non-display portion 42 and the first display portion 41, and the display surface of the second display portion 43 and the display surface of the first display portion 41 are respectively located on different sides of the rotating shaft 21.

In the display device of the present application, the display device has a first state and a second state, and in a case that the display device is in the first state, the area of the first display portion 41 is a, and the first display portion 41 has a larger display area, to effectively meet the user's needs in medium and large-size display application scenarios; in a case that the display device is in the second state, a part of the display module 40 can be wound around the rotating shaft 21, so that an area of the first display portion 41 is reduced, and a space occupied by the display device can be reduced, so that a space where the display device is located is more compact. Moreover, in the second state, the display module 40 further includes the second display portion 43 with a different display side from the first display portion 41, which enables the display device to realize a multi-sided display function and enables users to watch the display device from multiple angles.

In some embodiments of the present application, in a case that the display device is in the first state, the first cover plate 30 is furthest away from the rotating shaft 21 while ensuring the normal function of other components in the display device, that is, the first distance d1 is the maximum distance between the first cover plate 30 and the rotating shaft 21. In the first state, the display module 40 is not wound on the rotating shaft 21. However, in other embodiments of the present application, in the first state, a part of the display module 40 may be wound on the rotating shaft 21, but the amount of the display module 40 wound on the rotating shaft 21 in the first state is minimal compared to other states.

In some embodiments of the present application, in the first state, the display module 40 may include a first non-display portion 42 and a second display portion 43, wherein the first display portion 42 is wound on the rotating shaft 21, and the second display portion 43 is disposed between the first non-display portion 42 and the first display portion 41, wherein the display surface of the second display portion 43 and the display surface of the first display portion 41 are located on different sides of the rotating shaft 21, respectively. That is, the display device can implement a multi-sided display function in both the first state and the second state.

In some embodiments of the present application, in a case that the display device is in the second state, the first cover plate 30 is closest to the rotating shaft 21 while ensuring the normal function of other components in the display device, that is, the second distance d2 is the minimum distance between the first cover plate 30 and the rotating shaft 21. In the second state, the amount of the display module 40 wound on the rotating shaft 21 is maximum compared to other states.

In some embodiments of the present application, in a case that a third distance d3 is defined between the first cover plate 30 and the rotating shaft 21, the display area of the first display portion 41 is c, and the third distance d3 is greater than the second distance d2 and less than the first distance d1, and a, b and c are satisfied with: $b<c<a$. The display module 40 further includes a first non-display portion 42 and a second display portion 43, wherein the first non-display portion 42 is wound on the rotating shaft 21, and the second display portion 43 is disposed between the first non-display portion 42 and the first display portion 41, wherein the display surface of the second display portion 43 and the display surface of the first display portion 41 are respectively located on different sides of the rotating shaft 21.

In the display device of the present application, the display device has a third state. In the third state, the third distance d3 is greater than the second distance d2 and less than the first distance d1, that is, the amount of the display module 40 wound on the rotating shaft 21 in the third state is greater than the amount of the display module 40 wound on the rotating shaft 21 in the first state and less than the amount of the display module 40 wound on the rotating shaft 21 in the second state. Accordingly, the display area of the first display portion 41 is reduced, but the display area of the first display portion 41 in the third state is relatively greater than that in the second state. Since the normal display of the second display portion 43 can be ensured at the same time, the display device in the third state can realize a multi-sided display function while taking the display size into account.

In some embodiments of the present application, the reel assembly 20 further includes a first reel 22 and a second reel 23, the first reel 22 and the second reel 23 are spaced apart and each disposed on a side of the rotating shaft 21 away from the first cover plate 30, the first reel 22 is rotatably connected to the first side plate 11 and the second side plate 12, respectively, and the second reel 23 is rotatably connected to the first side plate 11 and the second side plate 12, respectively; wherein the display module 40 includes a first portion 401 disposed between the first cover plate 30 and the first reel 22, and a second portion 402 disposed between the rotating shaft 21 and the second reel 23. In a case that a first distance d1 is defined between the first cover plate 30 and the rotating shaft 21, the first portion 401 is the first display portion 41. In a case that a second distance d2 is defined between the first cover plate 30 and the rotating shaft 21, the first portion 401 is the first display portion 41 and the second portion 402 is the second display portion 43.

In the display device of the present application, the first reel 22 and the second reel 23 are provided at intervals and are provided on a side of the rotating shaft 21 away from the first cover plate 30, and the first reel 22 is rotatably connected to the first side plate 11 and the second side plate 12, respectively, and the second reel 23 is rotatably connected to the first side plate 11 and the second side plate 12, respectively, as such, the first reel 22 and the second reel 23 can support the display module 40 when the display module 40 is correspondingly extended or reeled during the movement of the first cover plate 30, and the first portion 401 and the second portion 402 of the display module 40 each have a stable configuration. Accordingly, in a case that a first distance d1 is defined between the first cover plate 30 and the rotating shaft 21, the first display portion 41 defined by the first portion 401 can have a flat display surface under the support of the first cover plate 30 and the first reel 22; in a case that a second distance d2 is defined between the first cover plate 30 and the rotating shaft 21, the first display portion 41 defined by the first portion 401 can have a flat display surface under the support of the first cover plate 30 and the first reel 22, and the second display portion 43 defined by the second portion 402 can have a flat display surface under the support of the second reel 23 and the rotating shaft 21, thereby improving the display quality of the display device, and making the extension process and the winding process of the display module 40 more smooth, improving the service stability of the display device, and prolonging the service life. Alternatively, the first reel 22, the second reel 23 and the rotating shaft 21 are arranged in parallel with each other, so as to make the extension process and the winding process of the display module 40 more smooth while ensuring the synchronous rotation of the first reel 22, the second reel 23 and the rotating shaft 21. Alternatively, the first portion 401 and the second portion 402 are arranged in parallel to make the display device more suitable for the display needs of consumers.

In some embodiments of the present application, the display module 40 further includes a third portion 403 disposed between the first reel 22 and the second reel 23, wherein in a case that a second distance d2 is defined between the first cover plate 30 and the rotating shaft 21, the display module 40 further includes a third display portion 44 disposed between the first display portion 41 and the second display portion 43. The display surface of the third display portion 44, the display surface of the first display portion 41, and the display surface of the second display portion 43 are respectively located on different sides of the rotating shaft 21, and the third portion 403 is the third display portion 44.

In the display device of the present application, the third part 403 also belongs to a part of the display module 40, and a display functional area (i.e., all areas with a display function) of the display module 40 is generally continuously provided. Therefore, in a case that a second distance d2 is defined between the first cover plate 30 and the rotating shaft 21, that is, the display device is in the second state, the third part 403 can serve as a third display portion 44 having a display function, thereby further enriching a multi-sided display function of the display device. Alternatively, the third portion 403 is perpendicular to the first portion 401 and the second portion 402.

In some embodiments of the present application, the display module 40 further includes a first corner portion 404 connecting the first portion 401 and the third portion 403, and the first corner portion 404 abuts the first reel 22. Alternatively, the first corner portion 404 has an arc with an angle of 90°. The display module 40 further includes a second corner portion 405 connecting the second portion 402 and the third portion 403, and the second corner portion 405 abuts the second reel 23. Alternatively, the second corner portion 405 has an arc with an angle of 90°.

In the display device of the present application, since the first corner portion 404 connecting the first portion 401 and the third portion 403 has an arc with an angle of 90°, and the second corner portion 405 connecting the second portion 402 and the third portion 403 has an arc with an angle of 90°, a right-angle bend is defined between the first portion 401 and the third portion 403 and defined between the second portion 402 and the third portion 403, to provide a smoother transition between the first portion 401 and the third portion 403 and a smoother transition between the second portion 402 and the third portion 403, and to provide a display surface for the first portion 401 perpendicular to the third portion 403 and a display surface for the second portion 402 perpendicular to the third portion 403.

Moreover, since the first corner portion 404 has an arc with an angle of 90° and the second corner portion 405 has an arc with an angle of 90°, the third portion 403 can be parallel to the rotating shaft 21, in a case that a second distance d2 is defined between the first cover plate 30 and the rotating shaft 21, the third display portion 44 defined by the third portion 403 has a plane display surface parallel to the rotating shaft 21, thereby improving the display quality of the display device at other viewing angles (such as a bottom viewing angle or a side viewing angle) while further enriching the application scenario of the display device.

Obviously, in other embodiments of the present application, the angle of the arc of the first corner portion 404 may have other values, such as 60°, 75°. The angle of the arc of the second corner portion 405 may also have other values, such as 60°, 75°.

It should be noted that in some embodiments of the present application, in a case that a first distance d1 is defined between the first cover plate 30 and the rotating shaft 21, that is, the display device is in the first state, the third portion 403 in the display module 40 may also have a display function, that is, the third portion 403 is the third display portion 44 in the first state.

In some embodiments of the present application, the display device further includes a support assembly 50 including a first support plate 51 and a second support plate 52, wherein the first support plate 51 is disposed on a side of the first portion 401 facing the second portion 402 and abuts the first portion 401; the second support plate 52 is disposed on a side of the second portion 402 facing the first portion 401 and abuts the second portion 402.

In the display device of the present application, the first supporting plate 51 provided on a side of the first portion 401 facing the second portion 402 and abutting the first portion 401 can support the first portion 401, thereby further improving a flatness of the display surface of the first display portion 41; the second supporting plate 52 provided on a side of the second portion 402 facing the first portion 401 and abutting against the second portion 402 can support the second portion 402, thereby further improving a flatness of the display surface of the second display portion 43. Alternatively, the first support plate 51 can be extended or shortened, so that the first support plate 51 can effectively support not only the first display portion 41 having the smaller display area b, but also the first display portion 41 having the larger display area a.

Figure 11:
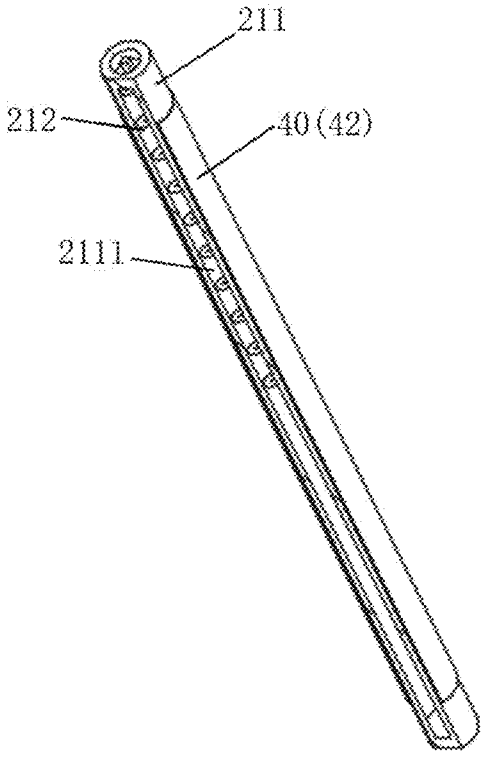
FIG. 11 is a schematic cross-sectional view of a rotating shaft according to Embodiment 1 of the present application.

FIG. 11 is a schematic cross-sectional view of a rotating shaft according to Embodiment 1 of the present application. Referring to FIG. 1 to FIG. 11, in some embodiments of the present application, the rotating shaft 21 includes a rotating shaft body 211 having a cavity 2111, and a coil spring 212, wherein the coil spring 212 is disposed in the cavity 211. In a case that a first distance d1 is defined between the first cover plate 30 and the rotating shaft 21, the coil spring 212 is in a stretched state; in a case that a second distance d2 is defined between the first cover plate 30 and the rotating shaft 21, the coil spring 212 is in a retracted state.

In the display device of the present application, the coil spring 212 can provide a pulling force to an end of the display module 40 during a contraction process and an extension process of the display module 40, so that the display module 40 is better fitted to the rotating shaft 21, the first reel 22, and the second reel 23, and so that the first portion 401, the second portion 402, and the third portion 403 are kept in a tight state at all times. As such, the flatness of a display surface of the first display portion 41, the second display portion 43, and the third display portion 44 is improved, and display quality of the display device is improved.

In some embodiments of the present application, the reel assembly 20 further includes a connecting rod 24, wherein the connecting rod 24 is connected to the first cover plate 30, and the connecting rod 24 can be extended or shortened to move the first cover plate 30 in a direction close to or away from the rotating shaft 21.

In the display device of the present application, the connecting rod 24 is connected to the first cover plate 30, and the connecting rod 24 can be extended or shortened to move the first cover plate 30 in a direction close to or away from the rotating shaft 21, so that the display device can be freely switched between the first state and the second state. Specifically, in a case that the length of the connecting rod 24 in a direction perpendicular to the first cover plate 30 (that is, the distance between the end of the connecting rod 24 close to the first cover plate 30 and the end of the connecting rod 24 away from the first cover plate 30) is maximum, a distance between the first cover plate 30 and the rotating shaft 21 is a first distance d1; in a case that the length of the connecting rod 24 in the direction perpendicular to the rotating shaft 21 is minimized, the distance between the first cover plate 30 and the rotating shaft 21 is a second distance d2.

In some embodiments of the present application, the connecting rod 24 includes a first connecting rod 241, a second connecting rod 242, a third connecting rod 243, and a fourth connecting rod 244, wherein the first connecting rod 241 and the second connecting rod 242 are disposed crosswise and rotatably connected; the third connecting rod 243 and the fourth connecting rod 244 are disposed crosswise and rotatably connected, an end of the third connecting rod 243 is rotatably connected to an end of the first connecting rod 241, and another end of the third connecting rod 243 is rotatably connected to the first cover plate 30; an end of the fourth connecting rod 244 is rotatably connected to an end of the second connecting rod 242, and another end of the fourth connecting rod 244 is rotatably and slidably connected to the first cover plate 30.

In the display device of the present application, the connecting rod 24 includes a first connecting rod 241, a second connecting rod 242, and a third connecting rod 243 and a fourth connecting rod 244, wherein the first connecting rod 241 and the second connecting rod 242 are disposed crosswise, and the third connecting rod 243 and the fourth connecting rod 244 are disposed crosswise, so that a scissor-type connecting rod structure can be formed, the supporting stability of the connecting rod 24 to the first part 401 is improved, and the display quality of the display device is improved. Moreover, an end of the fourth connecting rod 244 is rotatably connected to an end of the second connecting rod 242, another end of the fourth connecting rod 244 is rotatably and slidably connected to the first cover plate 30. A rotating and sliding connection combined with the scissor-type connecting rod structure can make the contraction and extension processes of the display module 40 more smooth, so that the user has a better experience on the switch of the display device between the first state and the second state.

In some embodiments of the present application, the connecting rod 24 further includes a fixing rod 245 and a sliding rod 246, wherein an end of the fixing rod 245 is fixedly connected to the first side plate 11, and an end of the sliding rod 246 is slidably connected to the second side plate 12, and another end of the fixing rod 245 is slidably connected to another end of the sliding rod 246; another end of the first connecting rod 241 is rotatably connected to the fixing rod 245, and another end of the second connecting rod 242 is rotatably connected to the sliding rod 246.

In the display device of the present application, since an end of the slide lever 246 is slidably connected to the second side plate 12, and another end of the fixing lever 245 is slidably connected to another end of the slide lever 246, the contraction process and the extension process of the display module 40 can be smoother, so that the user experience of the display device when switching between the first state and the second state is better. Moreover, since another end of the first connecting rod 241 is rotatably connected to the fixing rod 245, another end of the second connecting rod 242 is rotatably connected to the sliding rod 246, so that the connecting manner of the connecting rod 24 can be made simpler and more efficient.

In some embodiments of the present application, the reel assembly 20 further includes a motor 25 for controlling the sliding rod 246 to slide relative to the fixed rod 245.

In the display device of the present application, since the motor 25 can control the sliding rod 246 to slide relative to the fixed rod 245, the degree of automation of the display device in switching between the first state and the second state is improved.

Figure 9:
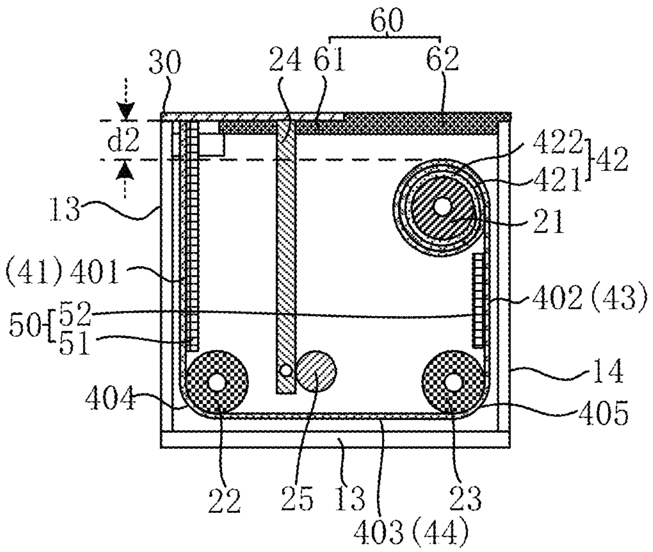
FIG. 9 is a right sectional view of the display device according to Embodiment 1 of the present application in a second state, taken along the line CC'.
Figure 10:
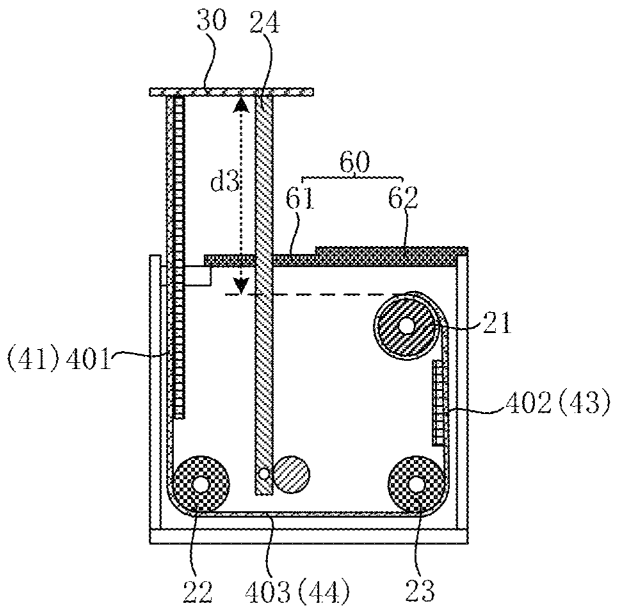
FIG. 10 is a schematic sectional view of a display device according to Embodiment 1 of the present application in a third state.

Referring to FIG. 9, in some embodiments of the present application, in a case that a second distance d2 is defined between the first cover plate 30 and the rotating shaft 21, wherein the second distance d2 is smaller than the first distance d1, the display module 40 further includes a first non-display portion 42 wound on the rotating shaft 21, and at least a part of the first non-display portion 42 may be different from the film layer structure of the second display portion 43, and the remaining part of the first non-display portion 42 may be the same as the film layer structure of the second display portion 43. Alternatively, the first non-display portion 42 includes a first functional portion 421 and a second functional portion 422, the first functional portion 421 may have the same film layer structure as one of the film layers of the second functional portions 422, and one of the film layer structures of the second functional portions 422 may be a flexible substrate layer; the second functional portion 422 may have the same film layer structure as the first display portion 41 and the second display portion 43. That is, the first function portion 421 cannot implement the display function, the second function portion 422 can implement the display function, the first function portion 421 separates the rotating shaft 21 from the second function portion 422. In the display device of the present application, the first function portion 421 can simplify at least a part of the film layer structure of the display module 40, reduce the manufacturing cost of the display module 40, and avoid a problem that the first function portion 421 is damaged due to a direct contact between the second function portion 422 capable of realizing the display function and the rotating shaft 21, thereby prolonging the service life of the display device.

In some embodiments of the present application, in a case that the second distance d2 less than the first distance d1 is defined between the first cover plate 30 and the rotating shaft 21, the display module 40 further includes a first non-display portion 42 wound on the rotating shaft 21, and the first non-display portion 42 may have the same film layer structure as the first display portion 41 and the second display portion 43. That is, in a case that the first non-display portion 42 protrudes from the rotating shaft 21, the first non-display portion 42 can be converted from a non-display area to a display area, thereby converting the first non-display portion 42 into a display portion of a display function. That is, any area of the display module 40 has the ability to display a picture. This structure ensures that the display device also has the function of multi-sided display when a first distance d1 is defined between the first cover plate 30 and the rotating shaft 21.

In some embodiments of the present application, the display device further includes a third side plate 13 and a fourth side plate 14 oppositely disposed, the third side plate 13 is disposed on the display side of the first portion 401, an end of the third side plate 13 is fixedly connected to the rotating shaft 21; the fourth side plate 14 is provided on a side of the second portion 402 away from the first portion 401, and an end of the fourth side plate 14 is fixedly connected to the rotating shaft 21. Alternatively, the first side plate 11, the second side plate 12, the third side plate 13, and the fourth side plate 14 are integrally formed. Alternatively, the first side plate 11, the second side plate 12, the rotating shaft 21, the third side plate 13, and the fourth side plate 14 are transparent plates.

In some embodiments of the present application, the display device further includes a second cover plate 60 disposed on the side of the reel assembly 20 away from the rotating shaft 21 and fixedly connected to the first side plate 11 and the second side plate 12.

In the display device of the present application, the second cover plate 60 provided on the side of the reel assembly 20 away from the rotating shaft 21 can cooperate with the first cover plate 30 to improve the sealability of the display device.

In some embodiments of the present application, the second cover plate 60 includes a first sub-portion 61 and a second sub-portion 62, a vertical distance between a surface of the first sub-portion 61 away from the rotating shaft 21 and the rotating shaft 21 is less than a vertical distance between a surface of the second sub-portion 62 away from the rotating shaft 21 and the rotating shaft 21, as such, a step is formed at the interface of the first sub-portion 61 and the second sub-portion 62, and the first cover plate 30 can sink to the step at the second state of the display device and contact the first sub-portion 61. Thus, the first cover plate 30 matches the second cover plate 60 to seal the top of the display device and prevent moisture and impurities from entering the display device.

In some embodiments of the present application, the height of the step is equal to a thickness of the first cover plate 30, so that the surface of the first cover plate 30 away from the rotating shaft 21 is flush with the surface of the second sub-portion 62 away from the rotating shaft 21 when the display device is in the second state, so that the top portion of the display device has a plane surface.

In some embodiments of the present application, the first sub-portion 61 is provided with an opening 611, and in a direction perpendicular to the rotating shaft 21, the connecting rod 24 is arranged in correspondence with the opening 611 so that the connecting rod 24 is telescoped in a direction perpendicular to the first cover plate 30.

Embodiment 2

Figure 12:
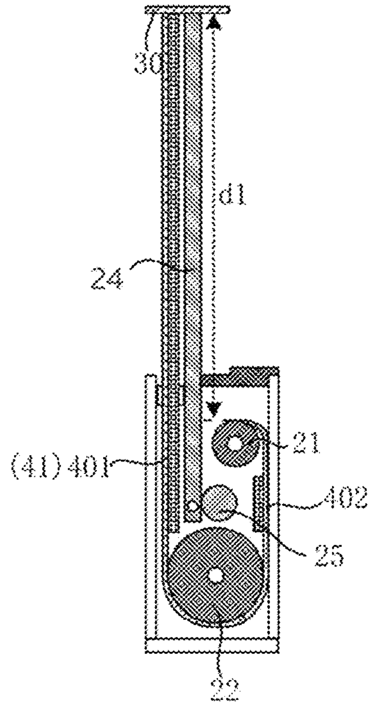
FIG. 12 is a schematic sectional view of a display device according to Embodiment 2 of the present application in a first state.
Figure 13:
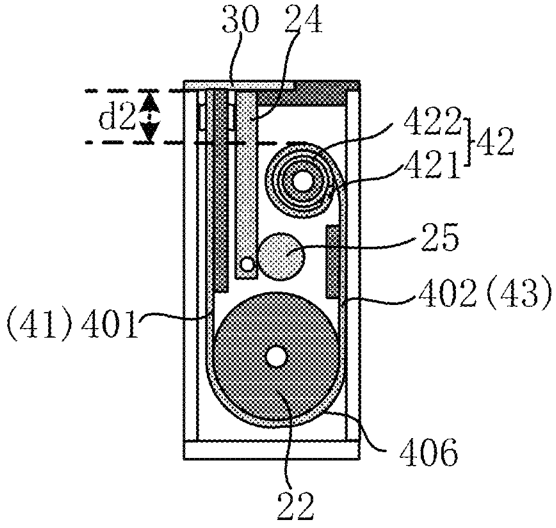
FIG. 13 is a schematic sectional view of a display device according to Embodiment 2 of the present application in a second state.

FIG. 12 is a schematic sectional view of a display device according to an Embodiment 2 of the present application in a first state; and FIG. 13 is a schematic sectional view of a display device according to Embodiment 2 of the present application in a second state. Referring to FIG. 1 to FIG. 13, the Embodiment 2 of the present invention provides a display device including a housing 10, a reel assembly 20, a first cover plate 30, and a display module 40. The housing 10 includes a first side plate 11 and a second side plate 12, and the first side plate 11 and the second side plate 12 are oppositely disposed. The reel assembly 20 includes a rotating shaft 21 rotatably connected to the first side plate 11 and the second side plate 12, respectively; the first cover plate 30 is provided on a side of the rotating shaft 21, and the first cover plate 30 is movable in a direction close to or away from the rotating shaft 21. An end of the display module 40 is fixedly connected to the first cover plate 30, another end of the display module 40 is fixedly connected to the rotating shaft 21, and the display module 40 includes a first display portion 41 connected to the first cover plate 30. In a case that a first distance d1 is defined between the first cover plate 30 and the rotating shaft 21, the first display portion 41 has an area a; in a case that a second distance d2 is defined between the first cover plate 30 and the rotating shaft 21, the first display portion 41 has an area b, and the second distance d2 is less than the first distance d1, and a and b are satisfied with: b<a, and the display module 40 further includes a first non-display portion 42 and a second display portion 43, wherein the first non-display portion 42 is wound around the rotating shaft 21, and the second display portion 43 is disposed between the first non-display portion 42 and the first display portion 41, and the display surface of the second display portion 43 and the display surface of the first display portion 41 are located on different sides of the rotating shaft 21, respectively.

It should be noted that the display device provided in Embodiment 2 of the present application is similar in structure to the display device provided in Embodiment 1 of the present application, and details of the same parts are not described in Embodiment 2 of the present application.

In some embodiments of the present application, the reel assembly 20 further includes a first reel 22 disposed on a side of the rotating shaft 21 away from the first cover plate 30, the first reel 22 is rotatably connected to the first side plate 11 and the second side plate 12, respectively; wherein the display module 40 includes a first portion 401 disposed between the first cover plate 30 and the first reel 22, and a second portion 402 disposed between the rotating shaft 21 and the first reel 22. In a case that a first distance d1 is defined between the first cover plate 30 and the rotating shaft 21, the first portion 401 is the first display portion 41. In a case that a second distance d2 is defined between the first cover plate 30 and the rotating shaft 21, the first portion 401 is the first display portion 41 and the second portion 402 is the second display portion 43.

Unlike the Embodiment 1 of the present application, the display module 40 of Embodiment 2 includes a first portion 401 disposed between the first cover plate 30 and the first reel 22, and a second portion 402 disposed between the rotating shaft 21 and the first reel 22. That is, the display device in the Embodiment 2 may be provided with only one reel, thereby reducing the number of reels, thereby eliminating the third portion 403 and reducing the space occupied by the display device. Moreover, in a case that a first distance d1 is defined between the first cover plate 30 and the rotating shaft 21, the first portion 401 is the first display portion 41; in a case that a second distance d2 is defined between the first cover plate 30 and the rotating shaft 21, the first portion 401 is the first display portion 41, and the second portion 402 is the second display portion 43. Therefore, the display panel provided in Embodiment 2 of the present application can still achieve a display effect of large-sized display and multi-sided display.

Moreover, in some embodiments of the present application, in a case that a first distance d1 is defined between the first cover plate 30 and the rotating shaft 21, that is, in the first state, the display module 40 may include a first non-display portion 42 wound on the rotating shaft 21, and a second display portion 43 disposed between the first non-display portion 42 and the first display portion 41, and the display surface of the second display portion 43 and the display surface of the first display portion 41 are respectively located on different sides of the rotating shaft 21. That is, the display device can implement a multi-sided display function in both the first state and the second state.

In some embodiments of the present application, the display module 40 further includes a third corner portion 406, wherein the third corner portion 406 connects the first portion 401 and the second portion 402. Alternatively, the third corner portion 406 may have an arc with an angle of 180°.

As above, the present application provides a display device including a housing, a reel assembly, a first cover plate, and a display module. The housing includes a first side plate and a second side plate, and the first side plate and the second side plate are oppositely disposed; the reel assembly includes a rotating shaft rotatably connected to the first side plate and the second side plate, respectively; the first cover plate is provided on a side of the rotating shaft, and the first cover plate is movable in a direction close to or away from the rotating shaft; an end of the display module is fixedly connected to the first cover plate, another end of the display module is fixedly connected to the rotating shaft, and the display module includes a first display portion connected to the first cover plate; in a case that a first distance is defined between the first cover plate and the rotating shaft, the first display portion has an area a; in a case that a second distance is defined between the first cover plate and the rotating shaft, the first display portion has an area b, and the second distance is less than the first distance, and a and b are satisfied with: $b<a$. The display module further includes a first non-display portion wound on the rotating shaft, and a second display portion disposed between the first non-display portion and the first display portion, and the display surface of the second display portion and the display surface of the first display portion are respectively located on different sides of the rotating shaft. In the display device of the present application, the display device has a first state and a second state. In the first state, the area of the first display portion is a, and the first display portion has a large display area, thereby effectively meeting a user's need in medium and large-sized display application scenarios; in the second state, the portion of the display module can be wound around the rotating shaft, so that the area of the first display portion can be reduced, and the space occupied by the display device can be reduced to provide a more compact configuration. In the second state, the display module further includes a second display portion that faces toward the display surface of the first display portion, thereby enabling the display device to realize a multi-sided display function, enabling a user to view display content of the display device from multi-angles, and enriching an application scenario of the display device.

A display device provided by the embodiments of the application is described in detail above, and the principle and implementation of the application are illustrated by using specific examples. The description of the above embodiments is merely provided to assist in understanding the method of the present application and the core concepts thereof. Meanwhile, according to the idea of this application, there will be changes in the embodiments and application scope for those skilled in this field. In view of the foregoing, the contents of the specification should not be understood as limitations on this application.

What is claimed is:

1. A display device, comprising:

a housing, wherein the housing comprises a first side plate and a second side plate, and the first side plate and the second side plate are oppositely disposed;

a reel assembly, wherein the reel assembly comprises a rotating shaft rotatably connected to the first side plate and the second side plate, respectively;

a first cover plate, wherein the first cover plate is provided on a side of the rotating shaft, and the first cover plate is movable in a direction close to or away from the rotating shaft;

a display module, wherein an end of the display module is fixedly connected to the first cover plate, another end of the display module is fixedly connected to the rotating shaft, and the display module comprises a first display portion connected to the first cover plate;

in a case that a first distance is defined between the first cover plate and the rotating shaft, the first display portion has an area a;

in a case that a second distance is defined between the first cover plate and the rotating shaft, the first display portion has an area b, and the second distance is less than the first distance, and a and b are satisfied with: $b<a$; and the display module further comprises a first non-display portion and a second display portion, wherein the first non-display portion is wound on the rotating shaft, and the second display portion is disposed between the first non-display portion and the first display portion, and a display surface of the second display portion and a display surface of the first display portion are respectively located on different sides of the rotating shaft, wherein the reel assembly further comprises a first reel and a second reel, wherein the first reel and the second reel are spaced apart and are each provided on a side of the rotating shaft away from the first cover plate, wherein the first reel is rotatably connected to the first side plate and the second side plate, respectively, and the second reel is rotatably connected to the first side plate and the second side plate, respectively;

wherein the display module comprises a first portion and a second portion, wherein the first portion is disposed between the first cover plate and the first reel, and the second portion is disposed between the rotating shaft and the second reel, in a case that the first distance is defined between the first cover plate and the rotating shaft, the first portion is the first display portion; in a case that the second distance is defined between the first cover plate and the rotating shaft, the first portion is the first display portion, and the second portion is the second display portion.

2. The display device of claim 1, wherein in a case that a third distance is defined between the first cover plate and the rotating shaft, a display area of the first display portion is c, wherein the third distance is greater than the second distance and less than the first distance, and a, b and c are satisfied with: $b<c<a$.

3. The display device of claim 1, wherein the display module further comprises a third portion disposed between the first reel and the second reel, wherein in a case that the second distance is defined between the first cover plate and the rotating shaft, the display module further comprises a third display portion disposed between the first display portion and the second display portion, wherein a display surface of the third display portion, the display surface of the first display portion, and the display surface of the second display portion are respectively located on different sides of the rotating shaft, and the third portion is the third display portion.

4. The display device of claim 3, wherein the display module further comprises a first corner portion and a second corner portion, the first corner portion connects the first portion and the third portion, and the first corner portion abuts the first reel, the first corner portion has an arc with an angle of 90°, and the second corner portion connects the second portion and the third portion, and the second corner portion abuts the second reel, the second corner portion has an are with an angle of 90°.

5. The display device of claim 1, wherein the reel assembly further comprises a first reel, wherein the first reel is disposed on a side of the rotating shaft away from the first cover plate, and the first reel is rotatably connected to the first side plate and the second side plate, respectively;

wherein the display module comprises a first portion and a second portion, wherein the first portion is disposed between the first cover plate and the first reel, and the second portion is disposed between the rotating shaft and the second reel, wherein in a case that the first distance is defined between the first cover plate and the rotating shaft, the first portion is the first display portion; in a case that the second distance is defined between the first cover plate and the rotating shaft, the first portion is the first display portion, and the second portion is the second display portion.

6. The display device of claim 5, wherein the display device further comprises a support assembly, the support assembly comprises a first support plate and a second support plate, wherein the first support plate is disposed on a side of the first portion facing the second portion and abuts the first portion; and the second support plate is disposed on a side of the second portion facing the first portion and abuts the second portion.

7. The display device of claim 1, wherein the display device further comprises a support assembly, the support assembly comprises a first support plate and a second support plate, wherein the first support plate is disposed on a side of the first portion facing the second portion and abuts the first portion; and the second support plate is disposed on a side of the second portion facing the first portion and abuts the second portion.

8. The display device of claim 1, wherein the rotating shaft comprises a rotating shaft body and a coil spring, wherein the rotating shaft body has a cavity, and the coil spring is arranged in the cavity;

in a case that the first distance is defined between the first cover plate and the bottom plate, the coil spring is in a stretched state;

in a case that the second distance is defined between the first cover plate and the bottom plate, the coil spring is in a retracted state.

9. The display device of claim 1, wherein the reel assembly further comprises a connecting rod, the connecting rod is connected to the first cover plate, and the connecting rod is extendable or shortenable to move the first cover plate in a direction close to or away from the rotating shaft.

10. The display device of claim 9, wherein the connecting rod comprises:

a first connecting rod and a second connecting rod, wherein the first connecting rod and the second connecting rod are disposed crosswise and rotatably connected;

a third connecting rod and a fourth connecting rod, wherein the third connecting rod and the fourth connecting rod are disposed crosswise and are rotatably connected, an end of the third connecting rod is rotatably connected to an end of the first connecting rod, and another end of the third connecting rod is rotatably connected to the first cover plate; an end of the fourth connecting rod is rotatably connected to an end of the second connecting rod, and another end of the fourth connecting rod is rotatably and slidably connected to the first cover plate.

11. The display device of claim 10, wherein the connecting rod further comprises:

a fixing rod and a sliding rod, wherein an end of the fixing rod is fixedly connected to the first side plate, an end of the sliding rod is slidably connected to the second side plate, and another end of the fixing rod is slidably connected to another end of the sliding rod; wherein another end of the first connecting rod is rotatably connected to the fixed rod, and another end of the second connecting rod is rotatably connected to the sliding rod.

12. The display device of claim 11, wherein the reel assembly further comprises a motor for controlling the sliding rod to slide relative to the fixed rod.

13. The display device of claim 1, wherein the display module further comprises a third portion disposed between the first reel and the second reel, in a case that the second distance is defined between the first cover plate and the rotating shaft, the display module further comprises a third display portion disposed between the first display portion and the second display portion.

14. The display device of claim 1, wherein in a case that the second distance d2 is defined between the first cover plate and the rotation shaft, the display module further comprises a first non-display portion wound on the rotation shaft, the first non-display portion comprises a first functional portion and a second functional portion, the first functional portion has a same film layer structure as a film layer of the second functional portion; the second functional portion has a same film layer structure as the first display portion and the second display portion.

15. The display device of claim 14, wherein the first function portion separates the rotation shaft from the second function portion.

16. The display device of claim 1, wherein in a case that the second distance is defined between the first cover plate and the rotation shaft, the display module further comprises a first non-display portion wound on the rotation shaft, and the first non-display portion has a same film layer structure as the first display portion and the second display portion.

17. The display device of claim 1, wherein the display device further comprises a second cover plate disposed on a side of the reel assembly away from the rotating shaft and fixedly connected to the first side plate and the second side plate, the second cover plate comprises a first sub-portion and a second sub-portion, a vertical distance between a surface of the first sub-portion away from the rotating shaft and the rotating shaft is less than a vertical distance between a surface of the second sub-portion away from the rotating shaft and the rotating shaft, a step is formed at an interface of the first sub-portion and the second sub-portion, in a case that the second distance is defined between the first cover plate and the rotating shaft, the first cover plate can sink to the step and contact the first sub-portion, a height of the step is equal to a thickness of the first cover plate.

18. The display device of claim 1, wherein the display device further comprises a third side plate and a fourth side plate oppositely disposed, the third side plate is disposed on a display side of the first portion; the fourth side plate is provided on a side of the second portion away from the first portion.

19. The display device of claim 18, wherein the first side plate, the second side plate, the rotating shaft, the third side plate, and the fourth side plate are transparent plates.

* * * * *